United States Patent
Boyle et al.

(10) Patent No.: US 10,381,040 B1
(45) Date of Patent: Aug. 13, 2019

(54) DYNAMIC HYBRID SHINGLED MAGNETIC RECORDING DEVICE

(71) Applicant: Western Digital Technologies, Inc., San Jose, CA (US)

(72) Inventors: William B. Boyle, Lake Forest, CA (US); Shad H. Thorstenson, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/024,211

(22) Filed: Jun. 29, 2018

Related U.S. Application Data

(60) Provisional application No. 62/627,021, filed on Feb. 6, 2018.

(51) Int. Cl.
  *G11B 20/12* (2006.01)
  *G11B 5/09* (2006.01)
  *G06F 3/06* (2006.01)

(52) U.S. Cl.
  CPC ............ *G11B 20/1217* (2013.01); *G11B 5/09* (2013.01); *G06F 3/068* (2013.01); *G06F 3/0685* (2013.01); *G06F 2212/217* (2013.01); *G11B 20/12* (2013.01); *G11B 2020/1238* (2013.01); *G11B 2020/1247* (2013.01)

(58) Field of Classification Search
  None
  See application file for complete search history.

(56) References Cited

U.S. PATENT DOCUMENTS

| | | | | |
|---|---|---|---|---|
| 8,699,159 | B1 * | 4/2014 | Malina | G11B 20/10305 360/31 |
| 8,817,413 | B1 * | 8/2014 | Knigge | G11B 5/6005 360/75 |
| 9,383,923 | B1 * | 7/2016 | Malina | G06F 3/0608 |
| 9,864,529 | B1 * | 1/2018 | Chen | G06F 3/0619 |
| 2014/0019680 | A1 * | 1/2014 | Jin | G11B 5/012 711/112 |

(Continued)

OTHER PUBLICATIONS

Brewer et al.; "Disks for Data Centers, White paper for FAST 2016"; Feb. 23, 2016; 16 pages; Version 1.1; available at https://ai.google/research/pubs/pub44830.

(Continued)

*Primary Examiner* — Tan X Dinh
(74) *Attorney, Agent, or Firm* — Barry IP Law, P.C.

(57) ABSTRACT

A write command is received to write data in a Conventional Magnetic Recording (CMR) realm of a disk to be formatted for writing data in non-overlapping tracks. The disk includes a plurality of areas of the disk that can be formatted as a CMR realm or as a Shingled Magnetic Recording (SMR) realm formatted for writing data in overlapping tracks. It is determined whether performance of the write command would require writing to begin in a portion of the CMR realm that has not been written with non-overlapping tracks. In response to determining that the performance of the write command would require writing to begin in a portion of the CMR realm that has not been written with non-overlapping tracks, a predefined data pattern is written using non-overlapping tracks in the portion of the CMR realm that has not been written with non-overlapping tracks.

20 Claims, 9 Drawing Sheets

(56) References Cited

U.S. PATENT DOCUMENTS

| | | | | |
|---|---|---|---|---|
| 2014/0055881 | A1* | 2/2014 | Zaharris | G11B 5/012 360/55 |
| 2014/0201424 | A1* | 7/2014 | Chen | G06F 3/0674 711/103 |
| 2014/0340786 | A1* | 11/2014 | Xu | G11B 5/3116 360/75 |
| 2015/0237138 | A1* | 8/2015 | Malina | H04L 67/1097 709/217 |
| 2015/0339319 | A1* | 11/2015 | Malina | G06F 16/1847 707/737 |
| 2018/0260332 | A1* | 9/2018 | Dunn | G06F 12/0875 |
| 2018/0342261 | A1* | 11/2018 | Das | G11B 5/012 |
| 2019/0013046 | A1* | 1/2019 | Kulkarni | G11B 20/1889 |

OTHER PUBLICATIONS

Theodore Ts'o; "Hybrid-SMR Product Requirements Proposal for OCP"; Nov. 13, 2017, 3 pages; available at https://www.opencompute.org/wiki/Storage.

Timothy Feldman; "Flex"; Seagate; Dec. 11, 2017; 17 pages; available at https://www.opencompute.org/wiki/Storage.

Pending U.S. Appl. No. 16/231,748, filed Dec. 24, 2018, entitled "Dynamic Performance Density Tuning for Data Storage Device", James N. Malina et al.

\* cited by examiner

| Seam Area = 8,194,048 | | | | | | |
|---|---|---|---|---|---|---|
| CMR/SMR | Realm | Current Mode | CMR Range | CMR Pointer(s) | SMR Range | Convertible | User |
| 60GB/--- | 0 | CMR | 0 - 125,829,119 | --- | --- | 0 | --- |
| 75GB/100GB | 1 | SMR | 125,829,120 - 283,115,519 | --- | 125,829,120 - 335,544,319 | 1 | --- |
| 85GB/100GB | 2 | SMR | 335,544,320 - 513,802,239 | --- | 335,544,320 - 545,259,519 | 1 | --- |
| 90GB/100GB | 3 | CMR | 545,259,520 - 734,003,199 | 626,218,132 | 545,259,520 - 754,974,719 | 1 | --- |
| ---/100GB | 4 | SMR | --- | --- | 754,974,720 - 964,689,919 | 0 | A |
| ... | ... | ... | ... | ... | ... | ... | ... |
| 10GB/- | n | CMR | x - z | --- | --- | 0 | --- |

FIG. 4

DYNAMIC HYBRID SHINGLED MAGNETIC RECORDING DEVICE

CROSS-REFERENCE TO RELATED APPLICATION

This application claims the benefit of U.S. Provisional Application No. 62/627,021, filed on Feb. 6, 2018, which is hereby incorporated by reference in its entirety.

BACKGROUND

Data Storage Devices (DSDs) are often used to record data onto or to reproduce data from a storage media. One type of storage media includes a rotating magnetic disk, such as in a Hard Disk Drive (HDD). In such DSDs, a head is positioned in relation to a disk to magnetically read and write data in tracks on a surface of the disk.

The amount of data that can be stored on a disk in a given area (i.e., an areal density) generally continues to increase with each new generation of DSDs that use a disk to store data. In some cases, some or all of the tracks on a disk may be written as overlapping tracks with Shingled Magnetic Recording (SMR) as a way of increasing the number of Tracks Per Inch (TPI) on the disk by making the tracks narrower. SMR increases TPI by using a relatively wide shingle write head with a stronger magnetic field to overlap tracks like roof shingles. The non-overlapping portion then serves as a narrow track that can be read by a narrower read head. However, the overlapping of tracks in an SMR zone means that previously written data cannot be modified or rewritten without affecting an adjacent track. SMR zones are therefore sequentially written in one radial direction (i.e., toward the inner diameter of the disk or toward the outer diameter of the disk) to avoid affecting previously written data in an adjacent track.

Some types of data may be better suited for the sequential writing of SMR than other types of data. For example, data that is not frequently modified or rewritten (e.g., cold data), such as video data for a movie file, can usually be sequentially written using SMR without having to worry about rewriting certain portions of previously written video data. On the other hand, data such as certain operating system files or data that is frequently changed as with a word processing program (e.g., hot data), may not be well suited for storage using SMR. For this reason, some disks may be formatted by the manufacturer to include a mix of Conventional Magnetic Recording (CMR) zones of non-overlapping tacks and SMR zones of overlapping tracks. The CMR zones can allow for storing data that may be randomly written or non-sequentially written, while SMR zones of overlapping tracks may be used to store data that is not frequently modified.

However, the location and number of CMR or SMR zones is generally fixed, despite the needs or data usage patterns of the DSDs in the field. Formatting of the disk into SMR and CMR zones is conventionally limited to being performed by the manufacturer at the factory since changing the formatting of the disk between SMR and CMR would change the storage capacities and addressing of sectors on the disk.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 4 is an example of a realms log according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
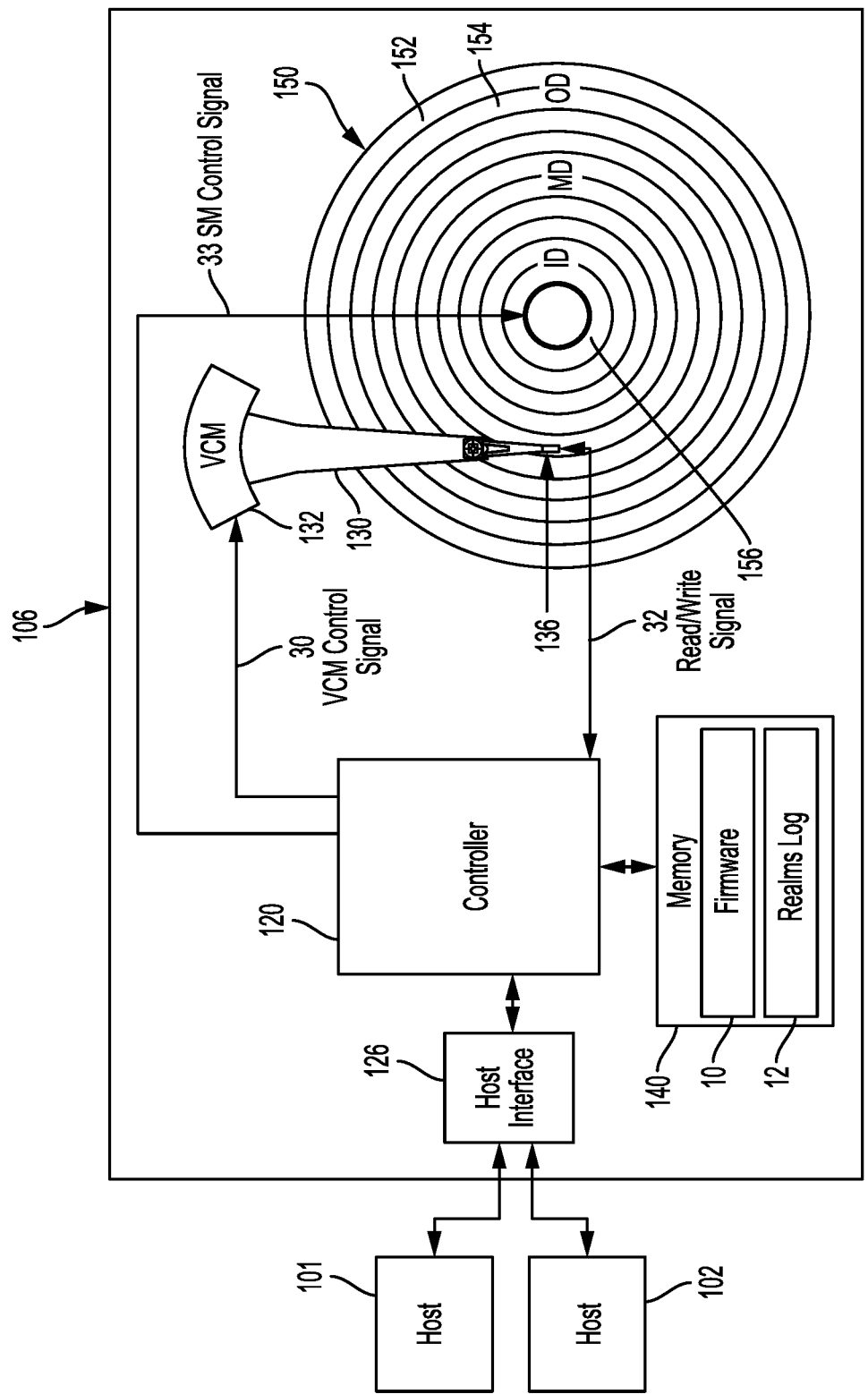
FIG. 1 is a block diagram of a Data Storage Device (DSD) configured to use dynamic hybrid Shingled Magnetic Recording (SMR) according to an embodiment.

FIG. 1 shows an example of Data Storage Device (DSD) 106 which communicates with hosts 101 and 102 according to an embodiment. In the example embodiment of FIG. 1, hosts 101 and 102 are separate from DSD 106, and may include, for example, a server or other computer system. In other embodiments, one or both of hosts 101 and 102 may be housed together with DSD 106 as part of a single electronic device, such as, for example, a desktop, laptop or notebook computer or another type of electronic device such as a tablet, smartphone, network media player, portable media player, or Digital Video Recorder (DVR).

DSD 106 includes controller 120 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, controller 120 can include a System on a Chip (SoC).

Host interface 126 is configured to interface DSD 106 with hosts 101 and 102, and may interface according to a standard such as, for example, Serial Advanced Technology Attachment (SATA), PCI express (PCIe), Small Computer System Interface (SCSI), Serial Attached SCSI (SAS), Ethernet, or WiFi. In this regard, host 101 and host 102 may not be physically co-located and may communicate over a network such as a Local Area Network (LAN) or a Wide Area Network (WAN), such as the internet. As will be appreciated by those of ordinary skill in the art, host interface 126 can be included as part of controller 120.

Hosts 101 and 102 communicate with DSD 106 to retrieve data from and store data in DSD 106. As used herein, a host can refer to a device that is capable of issuing commands to a DSD to store data or retrieve data. In this regard, host 101 or host 102 may include another storage device such as a smart DSD that is capable of executing applications and communicating with other DSDs.

In the example of FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks. A servo system (not shown) of controller 120 controls the rotation of disk 150 with SM control signal 33 and controls the position of head 136 using VCM control signal 30.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

As shown in FIG. 1, disk 150 includes realms or areas of the disk surface, such as realms 152, 154, and 156. The realms on disk 150 are concentrically laid out from an Outer Diameter (OD) portion of disk 150, through a Middle Diameter (MD) portion, to an Inner Diameter (ID) portion of disk 150. Each realm includes tracks for storing data in the realm. As described in more detail below, the realms on disk 150 can include Shingled Magnetic Recording (SMR) realms of overlapping tracks and/or Conventional Magnetic Recording (CMR) realms of non-overlapping tracks.

DSD 106 is a dynamic hybrid SMR DSD that is capable of dynamically converting certain realms from being written with overlapping tracks as an SMR realm into being written with non-overlapping tracks as a CMR realm, and vice-versa. SMR can allow for a greater storage capacity on disk 150 by increasing the number of Tracks Per Inch (TPI) on disk 150 with narrower overlapping tracks than the non-overlapping tracks used in CMR. However, as discussed above, the overlapping of tracks with SMR means that previously written data cannot be changed or rewritten without affecting an adjacent track. SMR zones are therefore sequentially written in one radial direction to avoid affecting previously written data in the realm.

Formatting of disks of DSDs for SMR or CMR is conventionally performed by the manufacturer at the factory since changing the formatting of the disk between SMR and CMR can change the storage capacities and addressing of sectors in tracks on the disk. In addition, Hard Disk Drives (HDDs) conventionally have all data blocks or sectors write initialized at the factory by writing empty tracks across the writeable area of the disk, which allows all the sectors to be accessed by users in the field. The tracks may be formatted with overlapping SMR tracks or with non-overlapping CMR tracks.

However, users of DSDs may want to change or convert SMR portions of the disk into CMR portions, or vice-versa, depending on their usage or data access patterns of the disk in the field, or as their data needs change during operation. As noted above, some types of data may be better suited for the sequential writing of SMR than other types of data. Data that is not frequently modified or rewritten, such a video data for a movie file, can usually be sequentially written using SMR without having to worry about rewriting certain portions of previously written video data. On the other hand, data such as certain operating system files or data that is frequently updated as with a word processing program, may not be suited for storage using SMR since previously written data often needs to be changed. For this reason, some disks may be formatted by a manufacturer to include both CMR zones of non-overlapping tacks and SMR zones of overlapping tracks.

The present disclosure allows different areas of the disk, referred to as realms, to be converted by hosts in the field by ensuring that the write initialization for the new format for the realm is sequentially written. Since read accesses may occur interspersed with write commands from a host to write initialize a realm for CMR or SMR, one aspect of the present disclosure also ensures that read accesses are only to those blocks or sectors that have been previously written with the new format or mode and not to other portions of the realm that have not been write initialized yet or may have been previously write initialized in the other format or mode.

As shown in FIG. 1, DSD 106 includes memory 140, which can include, for example, a non-volatile RAM or other solid-state memory. DSD 106 also includes memory 140 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete Non-Volatile Memory (NVM) chips, or any combination thereof.

Memory 140 can be used by DSD 106 to store data used by controller 120. Data stored in memory 140 can include data read from disk 150, data to be stored on disk 150, instructions loaded from firmware 10 for execution by controller 120, and/or data used in executing firmware 10. In some implementations, memory 140 can be a volatile memory, such as a Dynamic Random Access Memory (DRAM), or can be a solid-state NVM.

In the example of FIG. 1, memory 140 also stores realms log 12 or a portion of realms log 12 that has been loaded into memory 140 from an NVM, such as disk 150. In implementations where memory 140 is a volatile memory, a checkpointed copy of realms log 12 is stored in an NVM, such as on disk 150, so that realms log 12 is accessible across power cycles of DSD 106. Realms log 12 is used to manage the realms on disk 150. An example of a realms log is discussed in more detail below with reference to FIG. 4.

Those of ordinary skill in the art will appreciate that other embodiments can include more or less than the elements shown in FIG. 1, and that the disclosed processes can be implemented in other environments. For example, other embodiments can include a different number of hosts or DSDs, a different number of disks 150, or another type of NVM in addition to disk 150 or memory 140, such as a flash memory, as in the case of a Solid-State Hybrid Drive (SSHD).

In operation, host interface 126 receives host read and write commands from host 101 or host 102 via host interface 126 for reading data from and writing data to disk 150 of DSD 106. In response to a write command from host 101 or host 102, controller 120 may buffer the data to be written for the write commands in memory 140. As discussed in more detail below with reference to the example write and read processes of FIGS. 6 to 9, controller 120 uses realms log 12 to determine whether to write predefined data before writing data for write commands in CMR realms that have not been completely formatted for CMR based on the location of a CMR pointer in the CMR realm.

For data to be written on disk 150, a read/write channel (not shown) of controller 120 may encode the buffered data into write signal 32 that is provided to head 136 for magnetically writing data on disk 150. A servo system of controller 120 can provide VCM control signal 30 to VCM 132 to position head 136 over a particular track for writing the data.

To read data from disk 150, the servo system positions head 136 over a particular track, and controller 120 controls head 136 to magnetically read data stored in the track and send the read data as read signal 32. A read/write channel of controller 120 can then decode and buffer the data into memory 140 for transmission to host 101 or host 102 via host interface 126.

Figure 2:
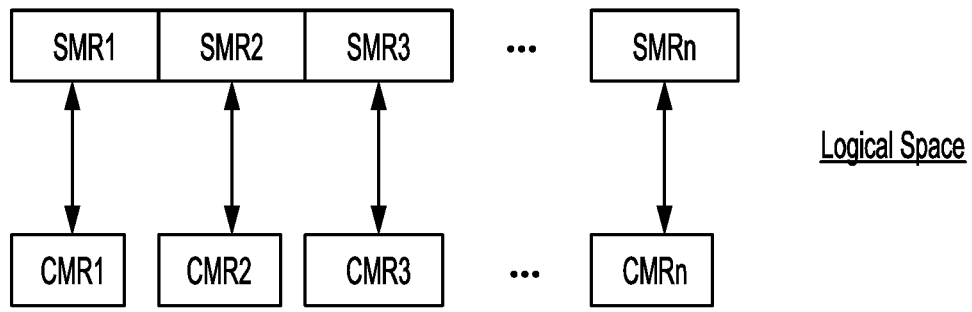
FIG. 2 illustrates an example of realms in a logical space that are convertible between SMR and Conventional Magnetic Recording (CMR) according to an embodiment.

FIG. 2 illustrates an example of realms in a logical space that are convertible between SMR and CMR formats according to an embodiment. As shown in FIG. 2, each of the SMR realms SMR1, SMR2, SMR3, and SMRn are convertible to corresponding CMR realms CMR1, CMR2, CMR3, and CMRn. In addition, each of the CMR realms CMR1, CMR2, CMR3, and CMRn are convertible to their respective SMR realms SMR1, SMR2, SMR3, and SMRn.

As shown in FIG. 2, the logical sizes or capacities of the CMR realms vary, while the logical sizes or capacities of the SMR realms remain fixed. In more detail, each of the SMR realms in FIG. 2 include the same number of logical addresses (e.g., Logical Block Addresses (LBAs)), while the number of logical addresses for the CMR realms have varying sizes less than the fixed size of the SMR realms. This is due to the geometry of the disk (e.g., disk 150) where the overlapping of tracks of the SMR realm provide more data storage for a given surface area of disk 150 than the same surface area or location written using CMR. In addition, locations near the ID and OD portions of the disk generally provide more of a difference in storage capacity between SMR and CMR than near the MD portion of the disk. In other words, the amount of data stored for a given area on the disk is nearly the same for SMR and CMR near a MD portion, but more data can be stored in a given area on the disk using SMR near the ID and OD portions than can be stored in the same area using CMR.

As discussed in more detail below with reference to the example conversion process of FIG. 10, controller 120 may allow some or all of the realms on disk 150 to be converted by a host (e.g., host 101 or 102) in the field after DSD 106 has left the factory and a user has begun using DSD 106. In some implementations, DSD 106 may be shipped to the user without any write initialization on disk 150 so that disk 150 is an unformatted, blank disk that has not been write initialized with empty tracks. In other implementations, DSD 106 may be shipped to the user with some but not all realms formatted or written on disk 150, such as with one or more CMR realms associated with a lowest range of logical addresses and/or a realm associated with a highest range of logical addresses.

In yet other implementations, DSD 106 may be shipped to the user with all of the realms already formatted for CMR, but with some or most of the CMR realms being convertible in the field to SMR. In such implementations, the initial format of CMR realms can allow DSD 106 to remain compatible with hosts that are not configured to use an SMR format. In still other implementations, DSD 106 may be shipped to the user with all or some of the realms already formatted for SMR, but convertible to CMR.

Figure 3:
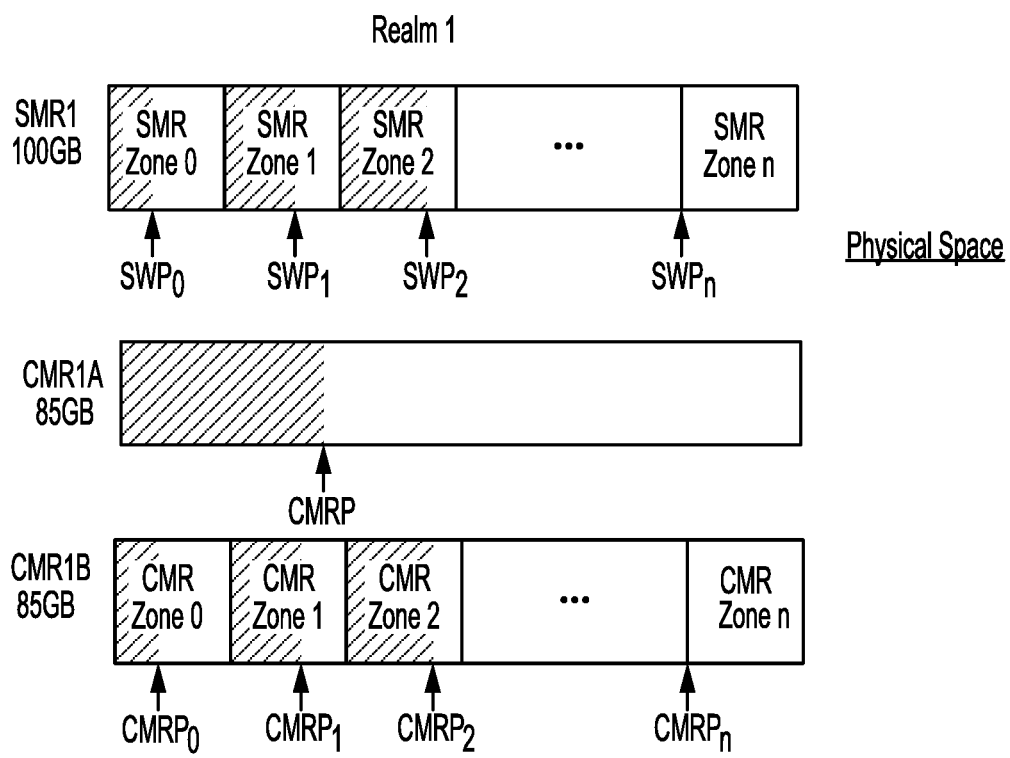
FIG. 3 illustrates an example of a convertible realm in a physical space according to an embodiment.

FIG. 3 illustrates an example of a convertible realm in a physical space according to an embodiment. As shown in FIG. 3, SMR realm SMR1 includes SMR zones that each include their own Sequential Write Pointer (SWP) to ensure that writing to each zone is performed sequentially so as to not affect or overwrite any previously written data. However, such sequential writing affects the handling of random or non-sequential writes in the SMR realm. In some implementations, random writes in an SMR realm may be handled by using address indirection so that new writes to a previously written logical address are reassigned to a different physical address (e.g., Physical Block Address (PBA)) in a different SMR zone. Such use of SWPs for SMR zones may follow a command protocol for SMR, such as with Zone Access Commands (ZAC) or Zone Block Commands (ZBC), as will be appreciated by those of ordinary skill in the art.

In addition, SMR zones may include a certain number of gap or empty tracks bordering a next zone in a write direction to protect against Far Track Interference (FTI) due to the wider write field used with SMR that can affect data stored in a vicinity of data being written. For example, SMR Zone 2 in FIG. 3 already has data written in it up to SWP2. As the writing in SMR Zone 1 progresses toward the beginning of SMR Zone 2 with SWP1 moving to the right, a number of gap tracks at the end of SMR Zone 1 can provide a buffer to protect the data written at the beginning of SMR Zone 2 from being affected by FTI.

As shown in the example of FIG. 3, realm SMR1 has a physical storage capacity of 100 GB. In such an example, each of the other SMR realms on disk 150 (e.g., SMR realms SMR2, SMR3, or SMRn in FIG. 2) can have the same storage capacity of 100 GB. This size can differ in other implementations, and may be set at the factory by the manufacturer. Similarly, each of the SMR zones in FIG. 3, such as SMR Zones 0, 1, 2, and n, can have the same storage capacity size, such as 256 MB.

As a CMR realm, or when SMR realm SMR1 is converted into CMR realm CMR1A or CMR realm CMR1B, the physical capacity of the realm reduces from 100 GB to 85 GB, even though the CMR version of the realm (i.e., realm CMR1A or realm CMR1B) occupies the same physical area on disk 150 as the SMR version of the realm (i.e., realm SMR1). In addition, instead of including SMR zones with a SWP for each zone, realm CMR1A uses a single CMR pointer that controls access to the converted CMR realm or when a portion of the CMR realm has not yet been formatted for CMR.

Alternatively, the CMR realm CMR1B can include a plurality of zones as with SMR realm SMR1. However, the CMR zones of realm CMR1B are to be written with non-overlapping tracks, as opposed to the SMR zones of realm SMR1 that are to be written with overlapping tracks. As shown in FIG. 3, each CMR zone of realm CMR1B is assigned a CMR pointer indicating a beginning of the CMR zone that has not yet been written with non-overlapping tracks.

As described in more detail below with reference to the example read and write processes of FIGS. 6 to 9, controller 120 can write a predefined data pattern using non-overlapping tracks if performance of a write command would require writing to begin in a portion of a CMR realm that has not been written with non-overlapping tracks. For example, a predefined data pattern of non-overlapping tracks can be written before writing data for commands that would require starting the write of data beyond the CMR pointer in realm CMR1A or beyond a CMR pointer in one of the CMR zones of realm CMR1B. The predefined data pattern can include, for example, a pattern of zeros to pad an area before writing the data for the write command.

As discussed in more detail below with reference to FIG. 7, the predefined data pattern may be written for a predetermined amount of data before writing the data for the write command or may be contiguous between a location corresponding to the CMR pointer and the data for the write command. For read commands beyond the CMR pointer, controller 120 may either block performance of the read command or may return predefined data such as a pattern of zeros to perform the read command. The foregoing handling of write and read commands in a portion of a CMR realm that has not yet been written with non-overlapping tracks ordinarily allows DSD 106 to prevent read or write errors from occurring when accessing portions of the CMR realm that have not been written yet or may be unreadable due to not having been formatted for CMR.

In cases where the realm has been previously converted from an SMR realm, data beyond the CMR pointer may still be written in the SMR format and may not correspond to the logical address to be accessed for a read command. In this regard, when a realm is erased, a partially written CMR realm that includes previously written SMR data would need to be rewritten with zeroed or null data using both CMR and SMR to erase all data in the realm. Similarly, a partially written SMR realm that includes previously written CMR data would need to be rewritten with zeroed or null data using both formats or modes to erase all of the data in the realm.

Unlike the SWPs used for the SMR zones of an SMR realm, a CMR pointer for a CMR realm or for a CMR zone allows random writes to locations in the realm or the CMR zone, respectively, before the CMR pointer. As discussed in more detail below, writes to locations in a CMR realm or a CMR zone that are not contiguous or before the CMR pointer are performed by writing a predefined data pattern before a beginning location corresponding to the beginning of where the data is to be written for the write command. The non-overlapping tracks in the CMR realm or CMR zone allow for rewriting previously written data without affecting the data in an adjacent track. As a result, aside from managing defective sectors, there is no need to use address indirection in the CMR realm as in the SMR realm to accommodate random or out-of-order writes and rewriting previously written logical addresses in a new physical location.

FIG. 4 is an example of realms log 12 according to an embodiment. In the example of FIG. 4, realms log 12 includes a size designated for seam areas, and information for each realm. The seam area is a portion of a CMR realm that is adjacent to an SMR realm. When a CMR realm is adjacent to an SMR realm, the seam area protects data in the SMR realm that is near the CMR realm from Adjacent Track Interference (ATI) and FTI. The deterioration of recorded data due to repeated writes in adjacent tracks can be referred to as ATI. The repeated writing of an adjacent track can cause an increased amount of errors when reading the data from tracks where adjacent tracks have been repeatedly written. DSD 106 can manage ATI within a CMR realm by using a refresh algorithm where data for a track may be rewritten to maintain the integrity of the recorded data.

However, rewriting tracks in an SMR zone typically requires rewriting all the data in the zone due to the sequential writing performed in SMR zones. This time to refresh or rewrite all the data in an SMR zone may be multiplied for multiple SMR zones that are near more frequently written CMR realms. In general, the initial portion of a CMR realm may be more frequently written than other portions of the CMR realm due to a host's tendency to assign logical addresses relatively sequentially and the longer time of use of the lower addresses in the CMR realm. As a result, one or more SMR zones adjacent to the beginning of a CMR realm may be particularly at risk for ATI from the relatively frequent writing at the beginning portion of the CMR realm.

The seam area can serve as either an area where writes are not allowed in the CMR realm or as an area where data is not written as frequently as other areas due to the seam area being adjacent or near an SMR realm. For example, a CMR realm may include a seam area on one end portion of the CMR realm that is adjacent an SMR realm, while another CMR realm may include a seam area on both ends if there are SMR realms on both sides of the CMR realm. In other cases, a CMR realm may not include a seam area if it does not border an SMR realm on either side.

Although the seam area consumes storage space in the CMR realm, this cost in storage capacity is balanced against the operational cost of needing to refresh or rewrite one or more SMR zones in SMR realms that are adjacent to a CMR realm. Since data stored in SMR zones is typically colder or less frequently written data, SMR zones that are near a CMR realm with a seam area may rarely, if ever, need to be refreshed, since the areas near the SMR zones are not being frequently written.

In some implementations, the size for seam areas is provided to a host (e.g., host 101 and/or host 102) as a number of logical addresses. In the example of FIG. 4, realms log 12 includes a header that defines the minimum seam area as 8,194,048 LBAs or a capacity of 4 GB. Other implementations may use a different seam area based on considerations such as the strength of the magnetic field used for writing or the width of tracks on the disk. The size for the seam areas may be provided to the host during a startup period of the host or during an initialization process of the DSD, as discussed in more detail below with reference to the example initialization process of FIG. 5.

As shown in the example of FIG. 4, realms log 12 includes for each realm, a current mode, a CMR address range, one or more CMR pointers, an SMR address range, an indication of whether the realm is convertible, and a user associated with the realm. Other implementations may not include all of the information shown in FIG. 4, or may include a different representation of the information, such as by using a starting and an ending address instead of an address range. For example, some implementations of realms log 12 may not include CMR pointers. The CMR pointers for different CMR zones and/or CMR realms may instead be stored in a zones table on DSD 106 apart from realms log 12. As another example, some implementations of realms log 12 may not include the association of a user with particular realms as in FIG. 4.

The current mode in realms log 12 indicates the current format set for the realm. In the example of FIG. 4, realms 0, 3, and n are currently set for a CMR format as CMR realms, and realms 1, 2, and 4 are currently set for an SMR format as SMR realms. The respective CMR and SMR capacities for each realm are provided next to realms log 12 for reference.

Each realm also has a CMR address range and an SMR address range assigned to it. The address ranges in FIG. 4 are expressed in terms of LBAs, with the CMR ranges as subsets within the SMR ranges. For example, realm 1 has an SMR range with a starting LBA of 125,829,120 and an ending LBA of 335,544,319, which corresponds to a 100 GB storage capacity, assuming a sector size of 512 bytes. The CMR address range for realm 1 is a subset within the SMR address range, with the same starting CMR address of 125,829,120 but a lower ending CMR address of 283,115,519, which corresponds to a 75 GB storage capacity assuming a sector size of 512 bytes. The starting address for both the CMR address range and the SMR address range for the next realm, realm 2, begin at the same LBA of 335,544,320, but end at different LBAs due to the different capacities between the SMR mode and the CMR mode.

In addition, realms 0, 4, and n are indicated as not being convertible in realms log 12 with a "0" value shown in the convertible column of realms log 12. Other implementations may use a different indication or way of maintaining the current mode for a non-convertible realm. Non-convertible CMR realms 0 and n cannot be converted from CMR to SMR and remain as CMR realms. As a result, these realms only include a CMR address range in realms log 12 without a corresponding SMR address range. Similarly, SMR realm 4 is not convertible, and cannot be converted into a CMR realm. SMR realm 4 therefore does not have a CMR address range in realms log 12.

The designation of whether a realm is convertible or not can be set by the manufacturer at the factory or in some implementations may also be set in the field by a user of a host computer. In the example of FIG. 4, realms 0 and n may be set as non-convertible to ensure compatibility with hosts that may not be configured for using SMR or a DSD that can dynamically convert realms between SMR and CMR formats. The realms in realms log 12 that have a "1" value in the convertible column may be converted from being one type of format or mode to the other. Other implementations of realms log 12 may use a different indication or value for indicating whether a realm is convertible.

In some cases, controller 120 may change the convertible designation for an SMR realm to non-convertible if the data written in the realm exceeds the ending CMR address for the realm. In such an example, the data stored in the realm will not be able to be completely rewritten into the CMR realm since the SMR realm includes addresses that exceed the CMR address range. In addition, some implementations may consider the amount of valid data written in the SMR realm when determining whether the realm is convertible to a CMR realm.

As discussed above, CMR realms that are adjacent to an SMR realm will include a seam area having at least the seam area size specified in the header of realms log 12. In the example of FIG. 4, CMR realms 0 and 3 would have seam areas, with CMR realm 0 having one seam area in the end portion of its CMR address range, and with CMR realm 3 having a seam area in the beginning portion of its CMR address range and another seam area in the end portion of its CMR address range. In addition, realm CMRn may or may not have a seam area in the beginning portion of its CMR address range depending on whether the realm before it (i.e., realm n−1) is currently in an SMR mode. Since the conversion of realms can occur during operation or is otherwise dynamic, seam areas may need to be added on the fly and address ranges increased or decreased for a realm when it is converted.

Each convertible CMR realm or CMR realm that has not already been completely formatted for CMR in realms log 12 includes an address corresponding to the current location of the CMR pointer for the realm that is within the CMR address range for the realm. In the example of FIG. 4, CMR realm 3 includes a CMR pointer at a location corresponding to logical address 626,218,132. CMR realm 3 may have either been converted from being an SMR realm or may have been unformatted with no CMR tracks written in the realm when DSD 106 was shipped from the factory. As discussed in more detail below with reference to the read and write processes of FIGS. 6 to 9, the use of a CMR pointer can allow DSD 106 to protect against reads and write to areas in a CMR realm that have not been written to yet. In this regard, the location corresponding to the CMR pointer indicates the beginning of a portion of a CMR realm or a CMR zone within a CMR realm that has not been written with non-overlapping tracks (i.e., write initialized) or formatted for CMR.

CMR realms 0 and n in FIG. 4 do not include CMR pointers because they have already been completely formatted for CMR or written with non-overlapping tracks. As discussed in more detail below with reference to FIG. 12, one or both of these CMR realms may have been formatted for CMR at the factory to allow for compatibility with hosts that are not configured for accessing a DSD with SMR. In other implementations, disk 150 may not initially include any CMR realms or may be initially formatted at the factory with all CMR realms for compatibility with hosts not configured to access DSDs using SMR. In addition, one or more of the CMR realms on disk 150 may serve as a runt realm or realm whose size is determined by the amount of leftover storage capacity on disk 150 when the total capacity of disk 150 is not a multiple of a fixed SMR realm size (e.g., 100 GB).

The SWPs used by SMR zones in an SMR realm protect against reads or writes that are beyond the SWP for the zone. The management of SWPs can include address indirection by controller 120 to ensure that data is physically written sequentially (i.e., drive managed SMR), or the host sending the commands may ensure that data is sequentially written using the SWPs (i.e., host managed SMR). The SWPs for SMR realms may be stored in another data structure at DSD 106, and/or at hosts 101 or 102. In some implementations, realms log 12 may also include SWPs in addition to the CMR pointers for current convertible CMR realms.

Realms log 12 also includes a user column to indicate realms that have been allocated to a particular user, such as a user associated with host 101 or with host 102. In the example of FIG. 4, SMR realm 4 has been allocated to user A and has been set as being non-convertible. In some implementations, such as in a Trusted Computing Group (TCG) application, SMR realm 4 will first need to be de-allocated from user A before it can become convertible. This ordinarily protects changes made to realms in cases such as in a cloud server, where realms may be used by different users or clients and include encryption to protect the data allocated to different users or clients. Other implementations, such as where the realms on disk 150 are not being shared among different users or clients, realms log 12 may not include an indication of a user associated with a realm.

Example Processes

Figure 5:
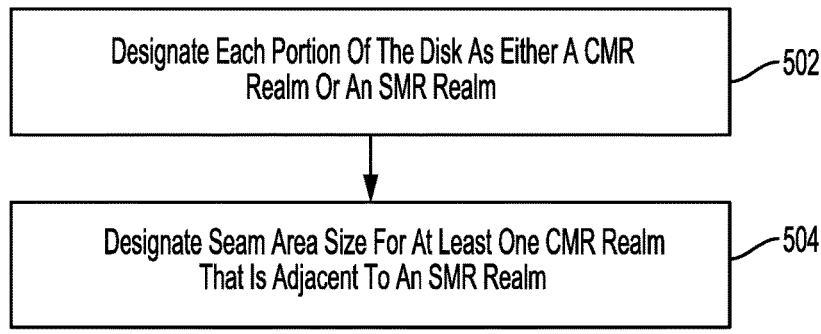
FIG. 5 is a flowchart for a dynamic SMR initialization process according to an embodiment.

FIG. 5 is a flowchart for a dynamic SMR initialization process according to an embodiment that can be performed by controller 120 executing firmware 10. The initialization process of FIG. 5 may be performed when DSD 106 is configured at the factory before it is sold.

In block 502, controller 120 designates each portion of disk 150 as either a CMR realm or an SMR realm. As noted above, certain implementations may designate all realms as CMR realms for compatibility with hosts that may not be configured for using SMR commands. The realms may be designated in realms log 12 with a current mode of either SMR or CMR.

In block 504, controller 120 designates a seam area for at least one CMR realm that is adjacent to an SMR realm. In cases where there are no CMR realms designated in block 502 that are adjacent to an SMR realm, such as when all of the realms are initially designated as CMR realms, the seam area size may still be designated in block 504, since a convertible CMR realm may be later converted in the field to an SMR realm. This conversion may then cause the host to relocate data from the seam area of the CMR realm or to otherwise reduce writing to logical addresses corresponding to the seam area. As discussed above, the seam area size may be stored in realms log 12, and provided to one or more hosts during a startup process of the host or the DSD.

Figure 6:
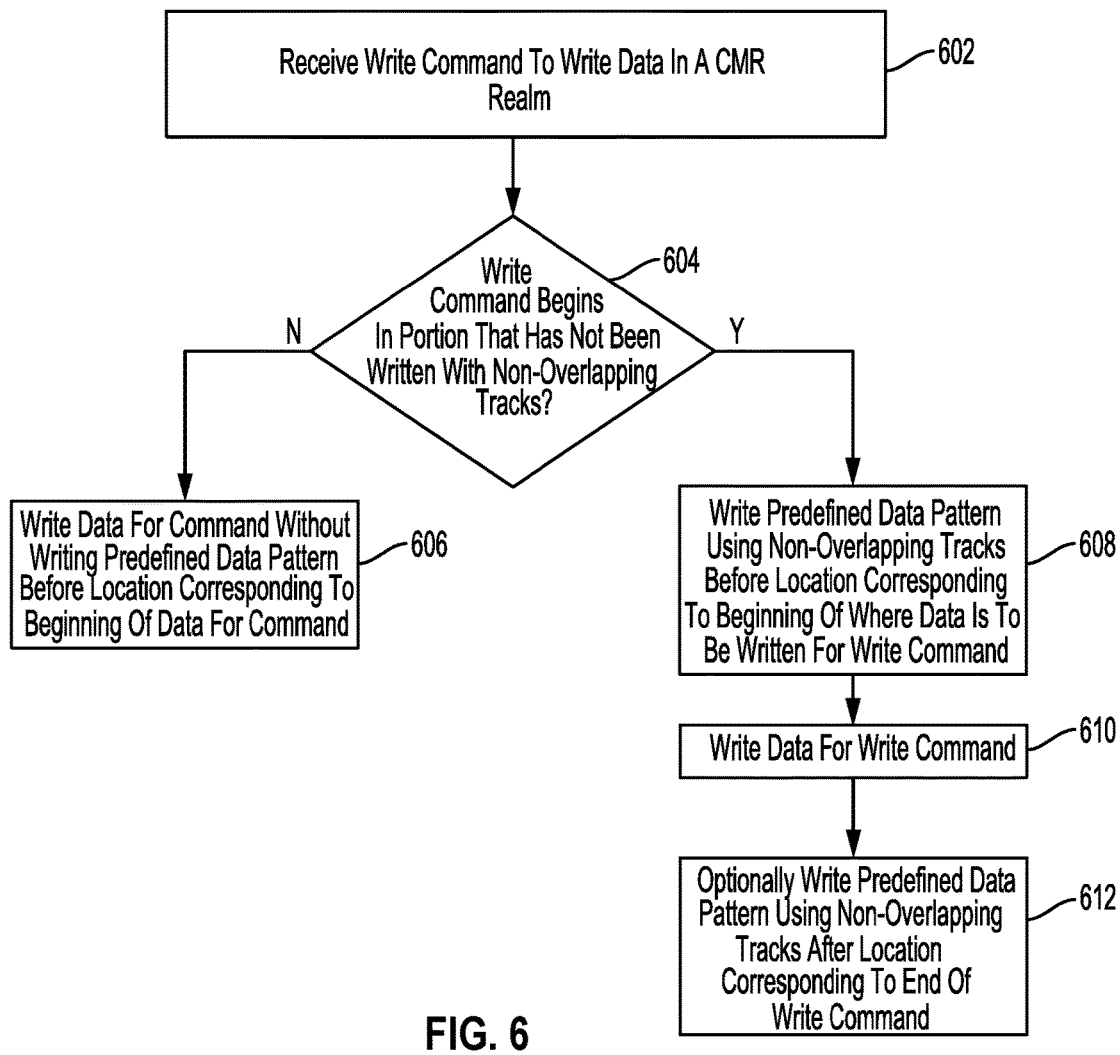
FIG. 6 is a flowchart for writing data in a CMR realm that has not been completely formatted for CMR according to an embodiment.

FIG. 6 is a flowchart for writing data in a CMR realm that has not been completely formatted for CMR according to an embodiment. The process of FIG. 6 may be performed by controller 120 executing firmware 10. In addition, the process of FIG. 6 for validating write commands in a CMR realm may only need to be performed in cases where the CMR realm has not been write initialized at the factory, such as by writing zero values for all the tracks in the CMR realm, or in cases where the realm has been newly converted from an SMR realm to a CMR realm and will be reformatted for CMR in the field by sequentially writing data from the host in the field. In some implementations, the write process of FIG. 6 may be performed after a certain period of command checking, where controller 120 may initially block commands to write data beyond a CMR pointer or return an error for such commands.

In block 602, DSD 106 receives a write command to write data in a CMR realm that has not been completely formatted for CMR or completely written with non-overlapping tracks. The CMR realm may have been previously an SMR realm or may have never been written with non-overlapping tracks beyond a location on disk 150 corresponding to the CMR pointer for the CMR realm. The write command may come from host 101 or from host 102, and can include at least one logical address associated with the data to be written. Controller 120 can use realms log 12 to determine that the at least one logical address for the data falls within a CMR realm.

In block 604, controller 120 determines whether the performance of the write command would require writing to begin in a portion of the CMR realm that has not been written with non-overlapping tracks. The beginning logical address for the write command can be compared in block 604 to a CMR pointer for the CMR realm or for a CMR zone within the CMR realm. In some implementations, the CMR pointer may be stored in realms log 12. In other implementations, the CMR pointer may be stored in a different location, such as in a zones table for disk 150.

If it is determined that performance of the write command would not require writing to begin in a portion of the CMR realm that has not been written with non-overlapping tracks (i.e., in a portion of the CMR realm already written with non-overlapping tracks), controller 120 in block 606 performs the write command by writing data for the write command without writing a predefined data pattern before a beginning location corresponding to the beginning of where the data is to be written for the write command. In other words, if it is determined that performance of the write command would require writing to begin before or at the location corresponding to the CMR pointer, controller 120 proceeds with performing the write command by positioning head 136 in FIG. 1 over the location on disk 150 corresponding to an initial logical address for the write command, and writing the data for the write command. In cases where the write begins before or at the CMR pointer, but the write continues past the CMR pointer, the address for the CMR pointer is advanced to one address past the end of the address range for the write command.

On the other hand, if it is determined in block 604 that performance of the write command would require writing to begin beyond the location corresponding to the CMR pointer, controller 120 in block 608 writes a predefined data pattern using non-overlapping tracks before a beginning location corresponding to the beginning of where the data is to be written for the write command so that the predefined data is adjacent the beginning location for the write command. After writing the predefined data pattern, controller 120 finishes performing the write command by writing the data for the write command from the beginning location corresponding to the beginning of where the data is to be written, which may correspond to an initial logical address for the write command.

The predefined data pattern can include a pattern of zero values. Other implementations may use a different predefined data pattern, such as a series of "1" values or a repeating pattern including "1" values and "0" values. In addition, some implementations may write the predefined data pattern contiguous from the location corresponding to the CMR pointer to the beginning location corresponding to the beginning of where the data is to be written for the write command, thereby formatting the portion of the CMR realm between the CMR pointer to the end of the write command.

Other implementations may only pad or write a predetermined amount of the predefined data pattern from a first location beyond the CMR pointer up to the beginning location corresponding to the beginning of where the data is to be written for the write command. In such implementations, realms log 12 can keep track of the ranges within the CMR realm that have been written with non-overlapping tracks so that controller 120 can determine if performing future writes requires any padding or writing of a predefined data pattern. In this regard, realms log 12 may therefore include multiple CMR pointers for each portion of the CMR realm or for each portion of a CMR zone that has been previously written with non-overlapping tracks.

In some cases, the amount of the predefined data pattern written from the first location to the beginning location corresponding to the beginning of where data is to be written for the write command can include one or more tracks on disk 150 immediately preceding the track where data is to be written for the write command, in addition to any preceding portion of the track including the starting location for the write command. For example, the amount of the predefined data pattern written can be in one to two tracks on disk 150 (e.g., 1.5 tracks) that immediately precede the start location for the write command, so that at least one whole track of the predefined data pattern is written before the start of the data written for the write command. This can take advantage or leverage the performance penalty or time needed to write data for the write command to further format an unformatted portion of the CMR realm beyond the CMR pointer by writing the predefined data pattern in non-overlapping tracks before the start of writing for the write command.

Similarly, controller 120 may also or alternatively write an amount of the predefined data pattern after performing the write command, such as for one or more tracks after writing the data for the write command. In such examples, the predefined data pattern written after performing the write command would be adjacent an ending location corresponding to the end of where data was written for the write command.

In the example process of FIG. 6, controller 120 writes the data for the write command in block 610, and then optionally continues writing in block 612 with the predefined data pattern after an ending location corresponding to the end of the write command. Other implementations may omit block 612 or may only write the predefined data pattern after performing the write command in block 610, instead of writing the predefined data pattern before the location corresponding to the beginning of the write command.

By writing only a localized area of the predefined data pattern adjacent to a beginning location and/or an ending location for a write command, it is ordinarily possible to limit the amount of formatting or padding when performing the write command. Any isolated or fragmented areas of non-overlapping tracks in the CMR realm can then be joined together over time as write commands are received in order to spread out the performance cost for formatting the CMR realm.

In some implementations, the amount of the predefined data pattern written can be a predetermined amount of data or a predetermined size on disk 150 (e.g., one track on disk 150 or a predetermined number of LBAs) for all write commands that require writing to begin beyond a location corresponding to the CMR pointer. As discussed below with reference to FIG. 7, other implementations may consider the amount of padding (i.e., the amount of the predefined data pattern) that would need to be written between the CMR pointer location and the beginning of a write command beyond the CMR pointer to determine whether to pad or format the entire space between the write command location and the CMR pointer location, or to only format or pad an isolated portion of the disk immediately before the write command location.

Figure 7:
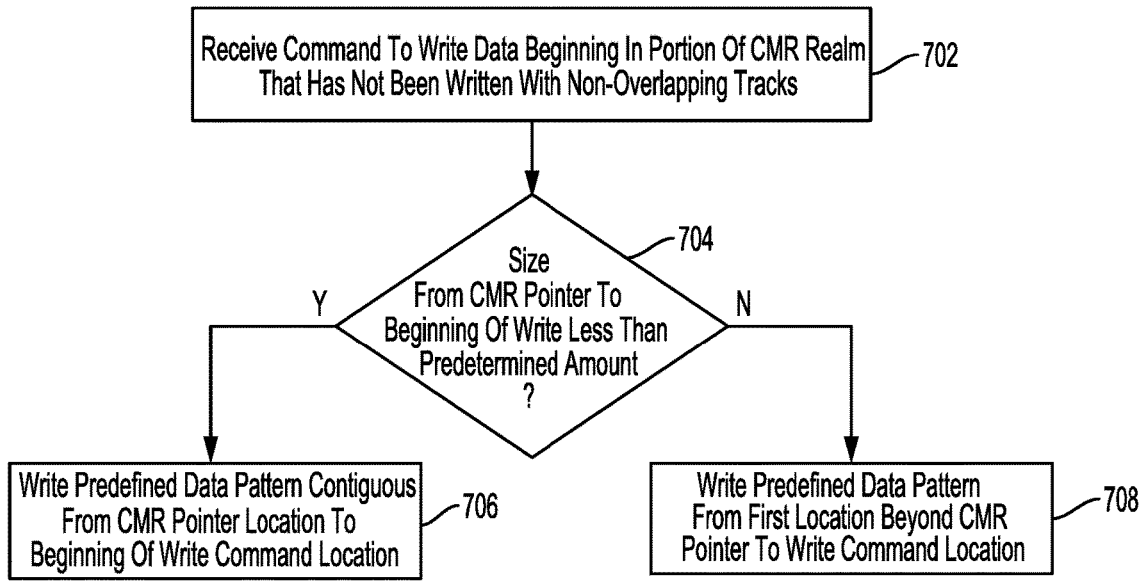
FIG. 7 is a flowchart for writing predefined data in a CMR realm according to an embodiment.

FIG. 7 is a flowchart for writing predefined data in a CMR realm according to an embodiment. The process of FIG. 7 may be performed by controller 120 executing firmware 10. In some implementations, the process of FIG. 7 may be performed as a sub-process of the write process of FIG. 6 when it is determined that the data to be written for a write command begins in a portion of a CMR realm that has not been written with non-overlapping tracks, as in block 608 of FIG. 6.

As with the process of FIG. 6, the write process of FIG. 7 would only be performed in cases where a CMR realm has not been completely formatted for CMR by previously writing the entire realm with non-overlapping tracks. A CMR realm may not be completely formatted for CMR if, for example, the DSD is shipped from the factory without any formatting or where a convertible realm was previously formatted as an SMR realm and then converted to a CMR realm.

In block 702, a write command is received to write data beginning at a location in a CMR realm that has not been written with non-overlapping tracks. In block 704, controller 120 determines whether a size from a CMR pointer location to a location corresponding to the beginning of the write command is less than a predetermined amount. In some implementations, the predetermined amount can be a number of logical or physical addresses, a number of tracks on disk 150, or may be a number of sectors or blocks of data. In cases where there are multiple discontinuous portions of the CMR realm that have been written with non-overlapping tracks, controller 120 in block 704 may determine whether the size from a nearest previous CMR pointer to the beginning location for the write command is less than the predetermined amount.

If it is determined in block 704 that the size from the CMR pointer location to the beginning location for the write command is less than the predetermined amount, controller 120 in block 706 writes a predefined data pattern using non-overlapping tracks contiguous from the CMR pointer location to the beginning of where the data is to be written for the write command. In other words, the area or portion of the disk between the CMR pointer and the beginning of the write command is padded or formatted using the predefined data pattern if this area or portion is less than a predetermined size (e.g., sectors and/or tracks) or amount of addresses or blocks.

If it is determined in block 704 that the size from the CMR pointer location to the beginning location for the write command is greater than or equal to the predetermined amount, controller 120 in block 708 writes the predetermined amount of the predefined data pattern using non-overlapping tracks from a first location beyond the CMR pointer location to the beginning of where the data is to be written for the write command. In this regard, the amount of padding or writing of the predefined data pattern can be limited to the predetermined amount. This can ordinarily prevent having to pad or format a large portion (i.e., greater than or equal to the predetermined amount) of the CMR realm between the CMR pointer location and the beginning of the write command when performing the write command received in block 702. As noted above, a resulting isolated area that has been formatted with non-overlapping tracks in a CMR realm can be connected or joined together later on with the formatting performed for future write commands received for the CMR realm.

Figure 8:
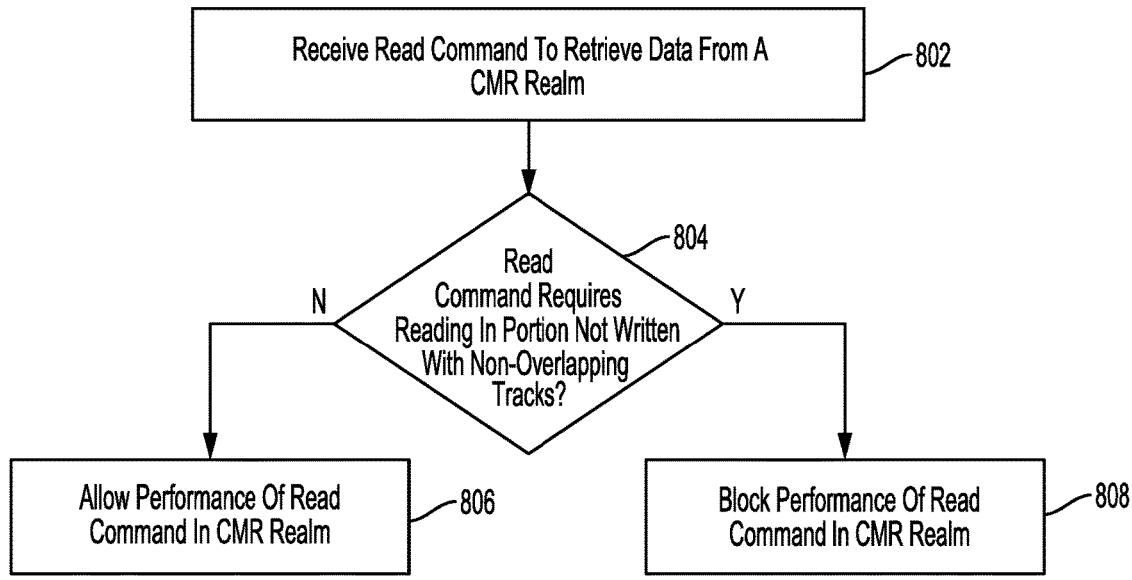
FIG. 8 is a flowchart for reading data in a CMR realm that has not been completely formatted for CMR according to an embodiment.

FIG. 8 is a flowchart for reading data from a CMR realm that has not been completely formatted for CMR according to an embodiment. The process of FIG. 8 can be performed by controller 120 executing firmware 10. In block 802, DSD 106 receives a read command to retrieve data from a CMR realm that has not been completely formatted for CMR or completely written with non-overlapping tracks. The read command may be received from a host, such as host 101 or host 102.

In block 804, controller 120 determines whether performance of the read command would require reading in a portion of the CMR realm that has not been written with non-overlapping tracks. Controller 120 may compare the logical address or logical addresses included with the read command with a CMR pointer for the realm. For example, the read command may include a starting logical address and an extent or length for the read command. Controller 120 can compare the last address for the extent to be read with the CMR pointer, and if the last address is greater than the CMR pointer, controller 120 determines that the read command requires reading beyond the location corresponding to the CMR pointer.

If it is determined in block 804 that performance of the read command does not require reading in a portion that has not been written with non-overlapping tracks, controller 120 allows the performance of the read command in block 806. On the other hand, if it is determined that the performance of the read command would require reading in a portion that has not been written with non-overlapping tracks, controller 120 blocks the performance of the read command in block 808. This prevents an attempt to read data from a portion of the realm that has not been formatted for CMR yet. In the case where there is no data written, reading the unformatted area would return an unreadable error. In the case where data may have been previously written in an SMR mode, the data retrieved would likely be the wrong data or would not be properly read.

The process of FIG. 8 can serve as a check against bugs or other software errors at the host that may interfere with reading data from a partially formatted CMR realm or CMR zone. In other cases, or after a certain period of checking, DSD 106 may be set to a permissive command mode for read commands, as described below with reference to FIG. 9.

Figure 9:
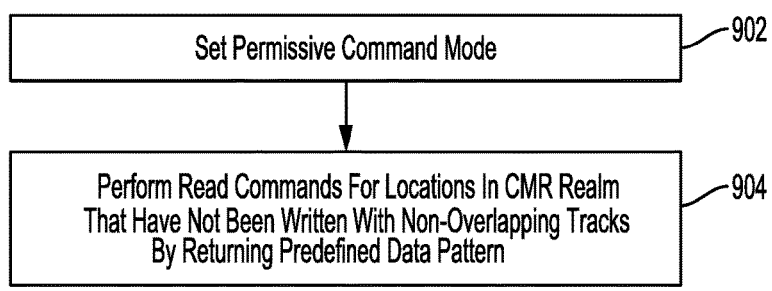
FIG. 9 is a flowchart for reading data in a CMR realm in a permissive command mode according to an embodiment.

FIG. 9 is a flowchart for performing a read command to a portion of a CMR realm that has not been written with non-overlapping tracks by using a permissive command mode according to an embodiment. The process of FIG. 9 can be performed by controller 120 executing firmware 10. The permissive command mode can be set as an alternative to the validation and blocking of read commands in the CMR read process of FIG. 8 discussed above. Unlike the blocking of read commands that begin in a portion of the CMR realm that has not been written with non-overlapping tracks as in the process of FIG. 8, the permissive command mode in the process of FIG. 9 can allow for the return of data for read commands in such a portion without returning a read error or aborted command error to the host.

As with the process of FIG. 8, the read process of FIG. 9 is performed in cases where a CMR realm has not been completely formatted for CMR by previously writing the entire realm with non-overlapping tracks. A CMR realm may not be completely formatted for CMR if, for example, the DSD is shipped from the factory without any formatting for the realm or where the realm was previously formatted as an SMR realm and then converted to a CMR realm.

In block 902, a permissive command mode is set by controller 120. The permissive command mode may be set by a host, such as host 101 or 102, or may be set at the factory as a default state for operating DSD 106.

In block 904, controller 120 performs one or more read commands for a location in a CMR realm that has not been written by non-overlapping tracks by returning a predefined data pattern to the host requesting the data. The predefined data pattern can include, for example, zero data or data including all ones for the number of blocks requested to be read by the read command.

Figure 10:
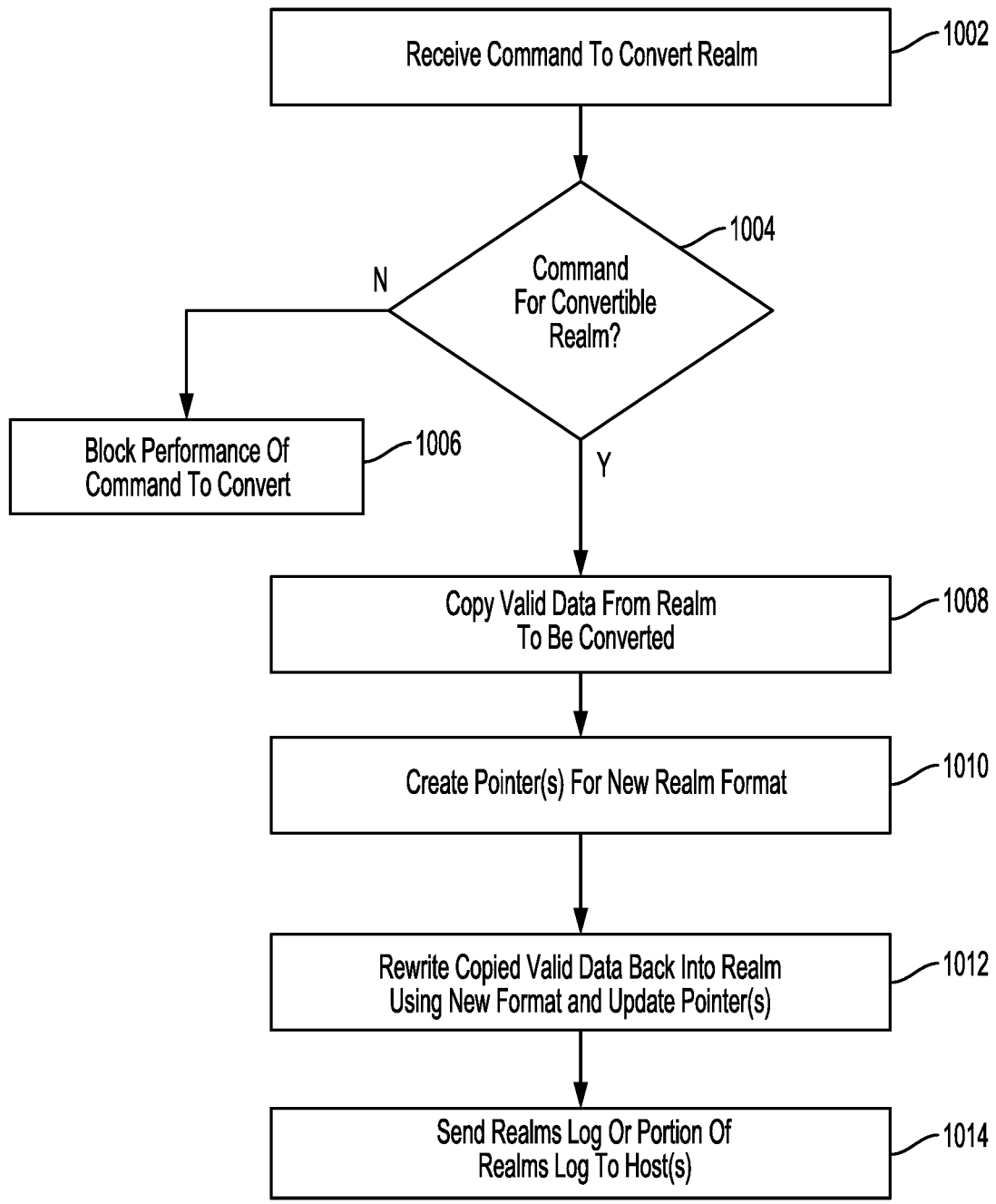
FIG. 10 is a flowchart for a realm conversion process according to an embodiment.

FIG. 10 is a flowchart for a realm conversion process according to an embodiment. The process of FIG. 10 can be performed by controller 120 executing firmware 10. In block 1002, DSD 106 receives a command from host 101 or 102 to convert a realm to the other format. The command may provide a realm number, address range, or starting address for the realm to be converted. The host sending the conversion command may have previously received realms log 12 from DSD 106 or a portion of realms log 12 associating the realms with logical addresses and indicating which realms are convertible.

In block 1004, controller 120 determines whether the command to convert the realm is for a convertible realm. Controller 120 may check realms log 12 for the realm identified in the command to see if a value or flag indicates that the realm is convertible. In some implementations, the realm may not be convertible if it is allocated to a user, was set at the factory as being non-convertible, or if it is an SMR realm that has exceeded a maximum logical ending address of the CMR address range for the realm. If the realm is determined not to be convertible in block 1004, controller 120 blocks the command to convert the realm. Controller 120 may also send an indication such as an error message to the host indicating that the realm cannot be converted.

If it is determined in block 1004 that the realm is convertible, the process proceeds to block 1008 to copy valid data from the realm to a new location, such as to another realm on disk 150 that may serve as a scratch area for copying data that may be rewritten as needed when converting realms or for other operations that may involve temporarily copying data, such as for garbage collection of SMR zones. In situations where the realm being converted does not include any valid data, no data would be copied in block 1004.

In some implementations, the current mode in realms log 12 is changed in response to the determination that the realm is convertible in block 1004. As discussed below with reference to FIG. 12, this can allow the pointer or pointers for the new mode to be compared to an initial writing location to determine whether the realm can be returned to its previous mode in the event that the conversion is interrupted. In addition, once the conversion process begins in 1008, all commands to the realm may be blocked or suspended to ensure coherency of the data in the realm.

A flag or other indication may also be set for the realm, such as in realms log 12, to indicate that a conversion of the realm is in progress. As discussed below with reference to the realm coherency process of FIG. 11, the indication of the realm being in the process of conversion can be used to determine how to treat the realm if the conversion is interrupted, such as by an unexpected power loss.

In the case where the realm to be converted is an SMR realm, the SMR zones of the SMR realm may include data that has been modified or deleted and therefore invalidated or made obsolete since the SMR zone is not typically rewritten each time data is modified. Instead, the address for the modified data is reassigned to a different physical location on disk 150 using address indirection. In the case where the realm to be converted is a CMR realm, the data written in the CMR realm is generally all valid since CMR will usually rewrite the modified data in the same location (i.e., write-in-place).

The realm where the valid data is copied to can include, for example, a non-convertible CMR realm, such as CMR realm 0 or CMR realm n in FIG. 4. The valid data is copied to facilitate recovery of the data if an unexpected power loss or other interruption occurs while the data is being rewritten in the new format in the realm, which is discussed in more detail below with reference to the realm coherency process of FIG. 11.

In block 1010 of FIG. 10, after the valid data in block 1008 has been copied, controller 120 creates a pointer or pointers for the new mode or format. In the case of an SMR realm being converted to a CMR realm, a CMR pointer is created at the first writable address for the realm, which may be immediately after a seam area if the beginning of the realm is adjacent to an SMR realm. In cases where there are multiple CMR zones in the CMR realm, a CMR pointer is created at the beginning of each CMR zone. In the case of a CMR realm being converted to an SMR realm, SWPs are created for each SMR zone in the SMR realm and are set to their initial locations in their respective SMR zones.

The new pointer or pointers are created by determining one or more corresponding logical addresses for one or more initial write locations in the realm being converted. The logical addresses for the one or more initial write locations may be determined by controller 120 using realms log 12.

In more detail, controller 120 may set a CMR pointer to the first address in the CMR address range for a newly designated CMR realm or may add the seam area size to the first address if an SMR realm precedes the newly designated CMR realm. In cases where there are multiple CMR zones, controller 120 may divide the address range for the CMR realm by a fixed CMR zone size and set or assign CMR pointers at respective initial locations for each division of the CMR address range. In the case of a newly designated CMR realm, one or more CMR pointers for the realm may be recorded in realms log 12 or in a zones table.

For a newly designated SMR realm, controller 120 may divide the SMR address range from realms log 12 by a fixed SMR zone size (e.g., a number of logical addresses corresponding to 256 MB) to locate SWPs at the beginning of each SMR zone. The SWPs may be recorded in an SMR zones table stored in DSD 106.

In block 1012, the copied valid data is rewritten in the newly designated realm using the new format of non-overlapping tracks for CMR or overlapping tracks for SMR. The pointer or pointers created in block 1010 for the realm can be updated in realms log 12 or in a zones table as the valid data is written in the new format. Once the valid data has been written back into the realm using the new format, a flag or other indication indicating that the realm is in the process of being converted may be reset to indicate that conversion of the realm is complete.

In block 1014, controller 120 sends the updated realms log to at least one host, such as to hosts 101 and 102. The updated realms log includes the new designation for the current mode or current format of the realm, and optionally the location of the CMR pointer or CMR zone pointers if the new mode is CMR. In addition, SWPs for a newly converted SMR realm are sent to the host or hosts if not included with the realms log information sent to the host or hosts. As noted above, the conversion of realms in the field between CMR and SMR can ordinarily allow a user to better tailor the use of disk 150 to the types of data or access patterns for the data stored on disk 150. In this regard, the use or access patterns of data stored on disk 150 may change over time. The foregoing conversion of realms into a different format ordinarily allows DSD 106 to adjust to changing data use or access patterns.

Figure 11:
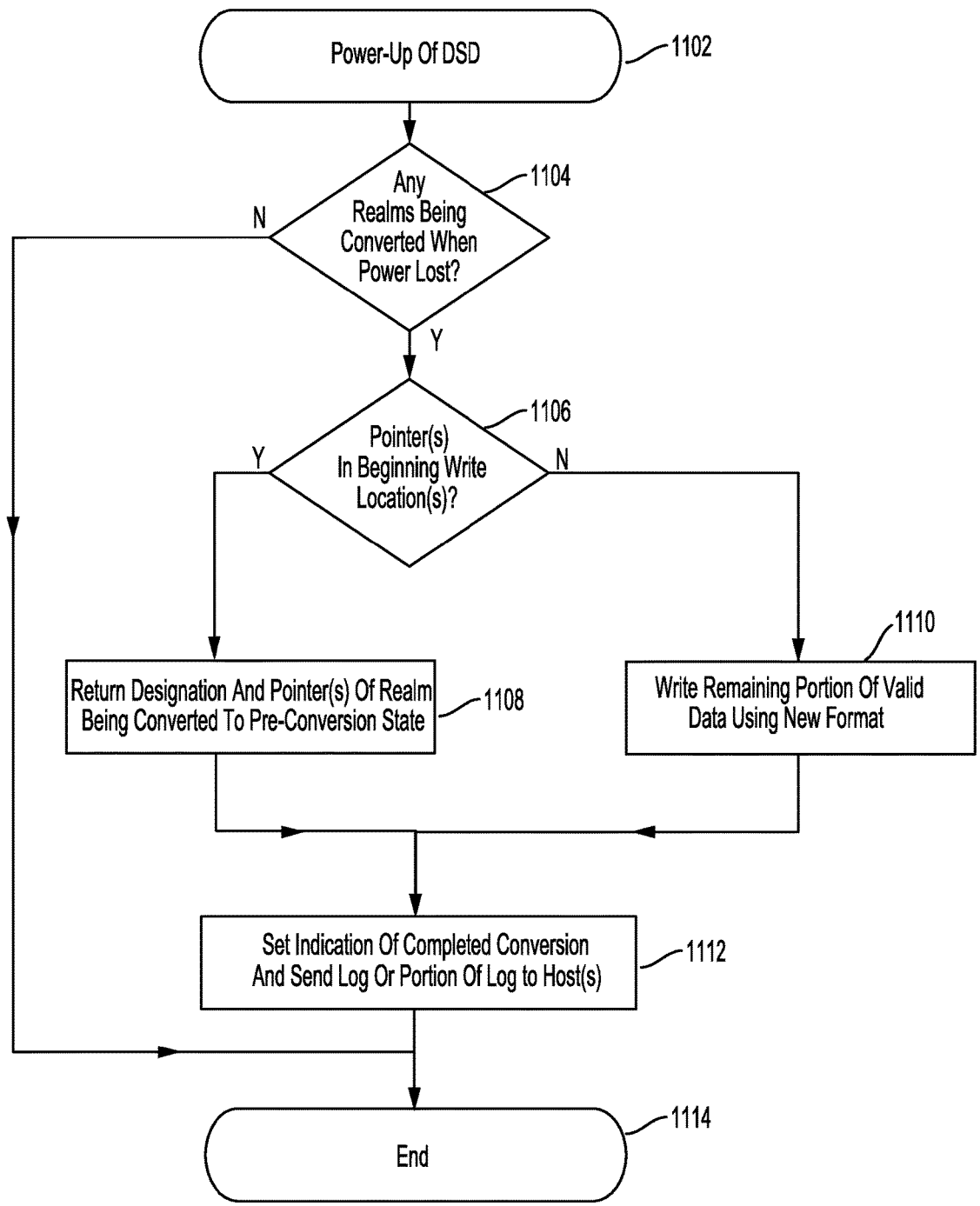
FIG. 11 is a flowchart for a realm coherency process according to an embodiment.

FIG. 11 is a flowchart for a realm coherency process according to an embodiment. The process of FIG. 11 can be performed by controller 120 executing firmware 10 following a power-up of DSD 106 to check if any realms were in the process of being converted before powering up, such as due to an unexpected power loss of DSD 106. In block 1102, the coherency process begins with the powering-up of DSD 106. Other applications of the coherency process of FIG. 11 may be performed after another type of interruption, such as after an interruption during realm conversion due to a mechanical shock to DSD 106.

In block 1104, controller 120 determines whether any realms were being converted when power was lost to DSD 106. Controller 120 may check realms log 12 or another data structure that is non-volatilely stored for an indication or flag indicating whether a realm was in the process of being converted before power was lost. If no realms are indicated as having been in the process of being converted in block 1104, the realm coherency process ends in block 1114.

On the other hand, if it is determined in block 1104 that there was a realm being converted when power was lost, it is determined in block 1106 whether all pointers for the new format indicated in realms log 12 for the realm are still in their initial write location. If so, the designation in realms log 12 of the realm being converted and its pre-conversion pointer or pointers are returned their pre-conversion state in block 1108. As noted above with reference to FIG. 10, the current mode during conversion may initially be set to the new mode while the previous pointer or pointers are temporarily retained until writing using the new format begins in the realm. This allows controller 120 to check if any data has been written in the new format in the realm, and if not, return the realm and its pointer or pointers to their pre-conversion state in block 1108. Other implementations may use a different way of determining whether writing in the new format has begun in the realm, such as by reading an initial portion or initial portions in the case of a new SMR realm.

The indication is then set in block 1112 indicating that conversion has completed, and the updated realms log 12 is sent to at least one host, such as host 101 or 102. This allows the realm to be treated the same as it was before conversion of the realm began.

If it is instead determined in block 1106 that the pointer or pointers for the new format are not in their initial write location or locations, the realm where the valid data was copied to is read to identify valid data that may still need to be written in the new format in the realm. In the case where valid data was in the process of being rewritten in the realm using the new format, but did not finish copying all of the valid data, the CMR pointer or at least one of the initial SWPs corresponding to the new mode set in realms log 12 will not be at their initial write locations. In this case, controller 120 in block 1110 can access the copy of the valid data from the scratch area or location where the valid data was copied to and continue to write the valid data back into the realm in the new format.

Once all of the valid data has been copied back into the realm, the flag or other indication can be set in block 1112 to indicate that conversion of the realm is complete. Realms log 12 or a portion of realms log 12 is then sent to at least one host to update the status of the realm at the host.

Figure 12:
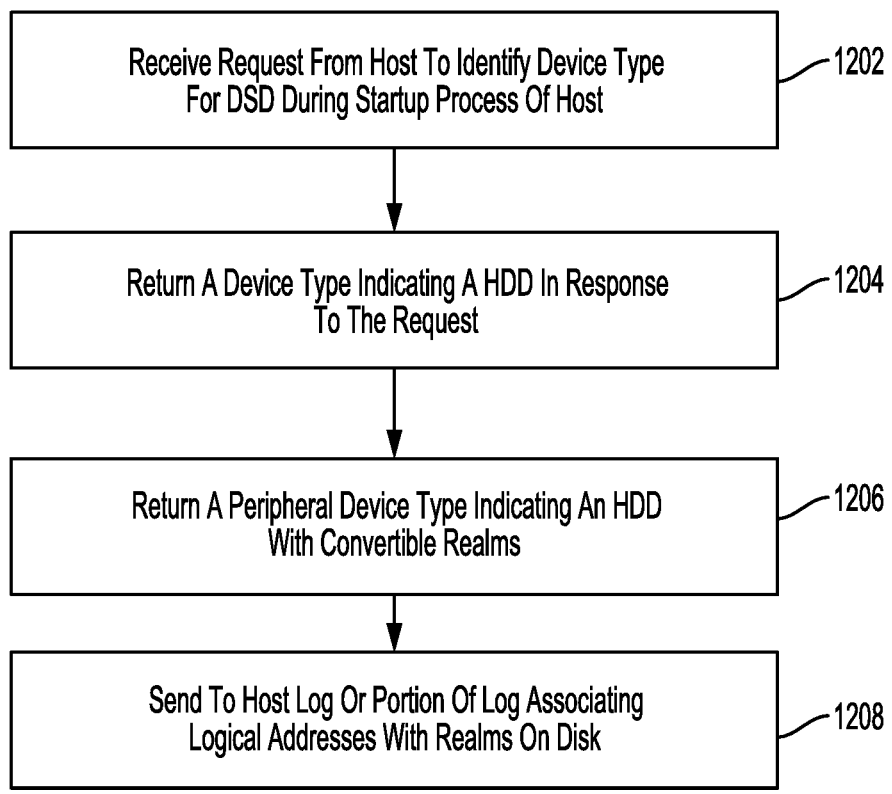
FIG. 12 is a flowchart for a dynamic SMR identification process according to an embodiment.

FIG. 12 is a flowchart for a dynamic SMR identification process according to an embodiment. The process of FIG. 12 can be performed by controller 120 executing firmware 10 to identify DSD 106 as including convertible realms. The process of FIG. 12 may be performed during a startup process of a host, such as host 101 or 102, when the host sends out a device identification request.

In block 1202, DSD 106 receives a request from the host to identify a device type for the DSD. In block 1204, controller 120 returns a device type indicating that the DSD is an HDD in response to the request. In block 1206, controller 120 further returns a peripheral device type indicating that DSD 106 is an HDD with convertible realms (i.e., a dynamic hybrid SMR drive). This ordinarily allows for hosts that are not configured to recognize a DSD with convertible realms to treat DSD 106 as a regular CMR drive and still use DSD 106. However, hosts that are configured to recognize DSDs that include convertible realms can further recognize the capability to convert realms by using the peripheral device identification.

In addition, the first realm on disk 150 (i.e., the realm that includes LBA 0) can be set as a non-convertible CMR realm. This can ensure that a legacy Basic Input/Output System (BIOS) of a host will be able to boot its operating system before any upper level device drivers are installed. As noted above, manufacturers may also format all of the realms to initially be CMR realms as a default to further facilitate backwards compatibility. Some BIOSs may use a Globally Unique Identifiers (GUID) Partition Table (GPT) stored in the last 32 KB of a DSD's storage capacity. The last realm associated with a greatest logical address range may therefore be set as a non-convertible CMR realm to accommodate the random writes made to a GPT in such systems.

In block 1208 of FIG. 12, controller 120 sends its realms log or a portion thereof to the host to associate logical addresses with the realms on the disk. In some cases, DSD 106 may wait until the host requests the realms log or portion of the realms log before sending it to the host. The host can then use the realms log to identify realms that may be converted from one format to another to best suit its data usage patterns.

As discussed above, the use of convertible realms in the present disclosure ordinarily allow for a more flexible use of both CMR and SMR formats on the same physical area of a disk, as opposed to the conventional static use of SMR or CMR for fixed locations on a disk after a DSD leaves the factory. In addition, the writing of a predefined data pattern using non-overlapping tracks when performing a write command in a portion of a CMR realm that has not already been written using non-overlapping tracks, ordinarily allows for the performance penalty or cost associated with formatting the CMR realm to be spread out throughout the operation of the DSD in the field.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
a disk for storing data in a plurality of areas of the disk that can be formatted as a Conventional Magnetic Recording (CMR) realm or a Shingled Magnetic Recording (SMR) realm, wherein the CMR realm is to be formatted for writing data in non-overlapping tracks and the SMR realm is to be formatted for writing data in overlapping tracks; and
a controller configured to:
receive a write command to write data in a CMR realm that has not been completely formatted for CMR;
determine whether performance of the write command would require writing to begin in a portion of the CMR realm that has not been written with non-overlapping tracks; and
in response to determining that the performance of the write command would require writing to begin in a portion of the CMR realm that has not been written with non-overlapping tracks, write a predefined data pattern adjacent a location corresponding to where the data is to be written for the write command.

2. The DSD of claim 1, wherein in response to determining that the performance of the write command would not require writing to begin in a portion of the CMR realm that has not been written with non-overlapping tracks, the controller is further configured to write the data for the write command without writing the predefined data pattern adjacent the location corresponding to where the data is to be written for the write command.

3. The DSD of claim 1, wherein the controller is further configured to write the predefined data pattern contiguous from a location corresponding to a CMR pointer to a beginning location corresponding to the beginning of where the data is to be written for the write command, and wherein the CMR pointer indicates the beginning of the portion of the CMR realm that has not been written with non-overlapping tracks.

4. The DSD of claim 3, wherein the controller is further configured to write an amount of the predefined data pattern from a first location beyond the location corresponding to the CMR pointer to the beginning location corresponding to the beginning of where the data is to be written for the write command.

5. The DSD of claim 4, wherein the amount of the predefined data pattern written from the first location to the beginning location corresponding to the beginning of where the data is to be written for the write command includes at least one track on the disk.

6. The DSD of claim 4, wherein the amount of the predefined data pattern written from the first location to the beginning location corresponding to the beginning of where the data is to be written for the write command is a predetermined amount of the predefined data pattern for all write commands that would require writing to begin in a portion of the CMR realm that has not been written with non-overlapping tracks.

7. The DSD of claim 1, wherein the CMR realm includes a plurality of CMR zones for writing non-overlapping tracks, and wherein each CMR zone of the plurality of CMR zones is assigned a CMR pointer indicating a beginning of the CMR zone that has not yet been written with non-overlapping tracks.

8. The DSD of claim 1, wherein in response to determining that the performance of the write command would require writing to begin in a portion of the CMR realm that has not been written with non-overlapping tracks, the controller is further configured to write the predefined data pattern after an ending location corresponding to the end of where the data is to be written for the write command.

9. The DSD of claim 1, wherein the controller is further configured to:
receive a command from a host to convert an SMR realm to a CMR realm; and
create one or more CMR pointers for the realm being converted by determining one or more corresponding logical address for one or more initial write locations in the realm being converted.

10. The DSD of claim 1, wherein after power is restored to the DSD following an unexpected power loss, the controller is further configured to:
determine whether a realm was being converted from an SMR to a CMR realm or from a CMR realm to an SMR realm when power was lost; and
in response to determining that a realm was being converted when power was lost:
determine whether all pointers for the realm being converted are at an initial writing location; and
in response to determining that all pointers for the realm being converted are at an initial writing location, return all pointers for the realm being converted to a pre-conversion state, and return the designation of the realm as an SMR realm or a CMR realm to the pre-conversion state.

11. A method for operating a Data Storage Device (DSD) including a disk for storing data, the method comprising:
receiving a write command to write data in a Conventional Magnetic Recording (CMR) realm to be formatted for writing data in non-overlapping tracks, wherein the disk includes a plurality of areas of the disk that can be formatted as a CMR realm or as a Shingled Magnetic Recording (SMR) realm formatted for writing data in overlapping tracks;
determining whether performance of the write command would require writing to begin in a portion of the CMR realm that has not been written with non-overlapping tracks;

in response to determining that the performance of the write command would require writing to begin in a portion of the CMR realm that has not been written with non-overlapping tracks, writing a predefined data pattern using non-overlapping tracks in the portion of the CMR realm that has not been written with non-overlapping tracks; and
in response to determining that the performance of the write command would not require writing to begin in a portion of the CMR realm that has not been written with non-overlapping tracks, writing the data for the write command without writing the predefined data pattern using non-overlapping tracks.

12. The method of claim 11, further comprising writing the predefined data pattern contiguous from a location corresponding to a CMR pointer to a beginning location corresponding to the beginning of where the data is to be written for the write command, and wherein the CMR pointer indicates the beginning of the portion of the CMR realm that has not been written with non-overlapping tracks.

13. The method of claim 12, further comprising writing an amount of the predefined data pattern from a first location beyond the location corresponding to the CMR pointer to the beginning location corresponding to the beginning of where the data is to be written for the write command.

14. The method of claim 13, wherein the amount of the predefined data pattern written from the first location to the beginning location corresponding to the beginning of where the data is to be written for the write command includes at least one track on the disk.

15. The method of claim 13, wherein the amount of the predefined data pattern written from the first location to the beginning location corresponding to the beginning of where the data is to be written for the write command is a predetermined amount of the predefined data pattern for all write commands that would require writing to begin in a portion of the CMR realm that has not been written with non-overlapping tracks.

16. The method of claim 11, wherein the CMR realm includes a plurality of CMR zones for writing non-overlapping tracks, and wherein each CMR zone of the plurality of CMR zones is assigned a CMR pointer indicating a beginning of the CMR zone that has not yet been written with non-overlapping tracks.

17. The method of claim 11, wherein in response to determining that the performance of the write command would require writing to begin in a portion of the CMR realm that has not been written with non-overlapping tracks, the method further comprises writing the predefined data pattern after an ending location corresponding to the end of where the data is to be written for the write command.

18. The method of claim 11, further comprising:
receiving a command from a host to convert an SMR realm to a CMR realm; and
creating one or more CMR pointers for the realm being converted by determining one or more corresponding logical addresses for one or more initial write locations in the realm being converted.

19. The method of claim 11, wherein after power is restored to the DSD following an unexpected power loss, the method further comprises:
determining whether a realm was being converted from an SMR to a CMR realm or from a CMR realm to an SMR realm when power was lost; and
in response to determining that a realm was being converted when power was lost:

determining whether all pointers for the realm being converted are at an initial writing location; and in response to determining that all pointers for the realm being converted are at an initial writing location, returning all pointers for the realm being converted to a pre-conversion state, and returning the designation of the realm as an SMR realm or a CMR realm to the pre-conversion state.

20. A non-transitory computer readable storage medium storing computer-executable instructions for operating a Data Storage Device (DSD) including a disk for storing data, wherein when the computer-executable instructions are executed by a controller of the DSD, the computer-executable instructions cause the controller to:

receive a write command to write data in a Conventional Magnetic Recording (CMR) realm that has not been completely formatted for CMR, wherein the disk includes a plurality of areas of the disk that can be formatted as a CMR realm for writing data in non-overlapping tracks or as a Shingled Magnetic Recording (SMR) realm formatted for writing data in overlapping tracks;

determine whether performance of the write command would require writing to begin in a portion of the CMR realm that has not been written with non-overlapping tracks; and in response to determining that the performance of the write command would require writing to begin in a portion of the CMR realm that has not been written with non-overlapping tracks, write a predefined data pattern adjacent a location corresponding to where the data is to be written for the write command.

* * * * *